3,184,347
Patented May 18, 1965

3,184,347

SELECTIVE CONTROL OF ELECTRON AND HOLE LIFETIMES IN TRANSISTORS

Jean A. Hoerni, Los Altos, Calif., assignor to Fairchild Semiconductor Corporation, Palo Alto, Calif., a corporation of Delaware No Drawing. Filed July 19, 1962, Ser. No. 211,132
2 Claims. (Cl. 148—33)

The present application is a continuation-in-part of my prior co-pending U.S. patent application 823,839, filed June 30, 1959, now abandoned.

The present invention relates in general to a process of selectively controlling the recombination rates in different parts of a transistor, and more specifically to the limitation of minority carrier lifetimes in the collector of a transistor without material reduction in the lifetimes of such carriers in the base of the transistor.

In the development of semiconductor devices, and transistors in particular, there has been expended considerable effort in the direction of increasing the lifetime of electrons and holes in semiconducting material. Although early semiconductor devices exhibited very poor properties in this respect, remarkable advances have been made so that very substantial lifetime values are now attainable with a consequent material improvement in transistor and semiconductor device characteristics. With transistor technology advanced to the point where desired electron and hole lifetime values are attainable, it now becomes feasible to consider the advantages that may be attained by controllably limiting such lifetime values.

One important advantage of limited lifetimes, is the reduction of storage effects so that more rapid switching is possible. Substantial advancement has been made in this respect in the field of semiconductor diodes, wherein there have been produced diode devices having very rapid switching times as a result of the limited lifetime values of the materials thereof. No corresponding improvement of transistors has been achieved.

It is well known that recombination rates of electrons and holes in excess of carrier equilibrium densities is dependent upon the presence and density of recombination centers in the semiconducting material. These recombination centers may be provided by imperfections in the crystal lattice or by the presence in the semiconducting materials of particular impurities. Particular effort has been expended in the control and production of crystal lattice imperfections by the utilization of neutron bombardment. Rather startling results have been achieved from this approach. In addition to the basic scientific advance afforded thereby, very substantial practical applications thereof have been realized. It will be appreciated that the utilization of neutron bombardment of semiconducting material has certain advantages in that, for example, very precise control is available over the results attained. Furthermore, a relatively inexpensive operation is possible with this approach, so that the commercial aspects thereof appear quite promising. One serious difficulty with this method of controlling lifetimes is the impermanency of the crystal lattice imperfections so produced. It has been found that subsequent heating tends to destroy the recombination centers produced by neutron bombardment, possibly in the manner of annealing. Consequently, this manner of controlling lifetimes is not available for use with conventional transistor manufacturing operations, as temperatures employed in encapsulation, for example, are sufficiently high to materially reduce or even remove the effects of neutron bombardment.

The above-noted alternative approach of diffusing selected impurities into semiconducting material from which semiconductor devices are to be formed, has also received extensive investigation. It has been found that the diffusion of particular impurities into semiconducting material during crystal pulling is highly advantageous in the manufacture of semiconductor diodes, inasmuch as no precise control over the location of the impurities is necessary therein. Insofar as transistors are concerned, it is necessary to maintain extended lifetimes in the base region in order to maximize current gain. Thus, transistors should preferably have short lifetime values in the collector and long lifetime values in the base. Attempts have been made to produce crystals of semiconducting material having different impurities in different portions thereof so that transistors formed therefrom will have different characteristics in different regions of the transistor. This procedure has been proven generally inapplicable to modern transistor technology, particularly in view of the extremely minute sizes of transistor zones in modern transistors.

The present invention is directed to a new and improved transistor structure and to an improvement in the process of manufacturing transistors. It is provided hereby that there shall be established permanent recombination center densities and that the steps hereof shall readily combine with the steps of known transistor manufacturing processes. The method of the present invention provides for the reduction in lifetimes of minority carriers in the collector of an NPN transistor with no material effect upon the lifetimes of minority carriers in the base of the transistor. This then provides for the minimization of switching time without a corresponding decrease in current gain.

It is an object of the present invention to provide an improved process for the selective control in NPN transistors of lifetime values of electrons and holes in excess of carrier equilibrium densities.

It is another object of the present invention to provide a process of permanently limiting recombination rates in selected portions of a transistor without materially affecting recombination rates in the remainder of the transistor.

It is a further object of the present invention to provide an improved NPN transistor having minimized minority carrier lifetimes in the collector thereof and maximized minority carrier lifetimes in the base of the transistor.

It is yet another object of the present invention to provide an improvement in the process of transistor manufacture for reducing the lifetime of minority carriers in excess of carrier equilibrium densities in the collector of a silicon NPN transistor, without material reduction of lifetime values in the base thereof, by operation upon otherwise completed transistor structures.

Various other possible objects and advantages of the present invention will become apparent to those skilled in the art from the following description of particular preferred steps of the present invention and a preferred embodiment of the device hereof. It is not, however, intended to limit the invention by the terms of the following description, but instead reference is made to the appended claims for a precise delineation of the true scope of the present invention.

Careful consideration of transistor behavior shows that lifetime requirements are not the same in the different regions of the transistor. In order to attain high current gain, it is necessary for the base zone to have high lifetime values, while the collector zone should preferably have lower lifetime values in order to reduce storage effects. The limited lifetime values desired in the collector portion of the transistor are of particular importance when the transistor is employed in switching applications, inasmuch as storage effects produced by extended lifetimes serve to increase the switching time. Unfortunately, conventional manufacturing processes employed in producing double-diffused transistors, for example, do not provide the above noted relative lifetime values. To the contrary, the diffused base material of a transistor normally has a lower lifetime value than the undiffused semiconducting material of the collector. It will be appreciated that any operation upon the transistor which affects the lifetime values in the base and collector equally can only produce an advantage at the expense of producing a corresponding disadvantage. For example, a more rapid switching time may be attained by decreasing lifetime values in the collector, however, a corresponding decrease in the lifetime values in the base will then materially decrease the current gain of the transistor. Consequently, processing of a crystal before device manufacture is not suitable. The process of this invention operates to selectively reduce lifetime values in predetermined portions or zones of a transistor. In accordance herewith, the lifetime values of minority carriers in excess of equilibrium density is decreased in the collector alone, while retaining the more extended lifetimes desired in the base portion of the transistor.

In order to achieve the foregoing differential variation in lifetime values, it is herein provided that the properties of deep level impurities such as gold shall be employed to effect the recombination rate of electrons and holes to a different extent in materials of different types (n or p). It will be appreciated that electron and hole recombination rates, or electron and hole lifetimes, are necessarily the same in a given semiconductor region, neglecting the effects of trapping. The symbols $\tau_{n0}$ and $\tau_{p0}$ are herein employed as representing electron and hole lifetimes prevailing in strongly P-type semiconducting material and strongly N-type semiconducting material, respectively. Electron and hole lifetimes may be determined from the following relationships:

$$\tau_{n0}=\frac{1}{v_n N \sigma_{n0}} \text{ and } \tau_{p0}=\frac{1}{v_p N \sigma_{p0}}$$

In the foregoing relationships $v_n$ and $v_p$ are the carrier thermal velocities, N is the denisty of impurity centers, and $\sigma_{n0}$ and $\sigma_{p0}$ are the capture cross-sections in strongly P-type and N-type semiconducting material, respectively. Inasmuch as the carrier thermal velocities are substantially constant following establishment of the transistor doping levels, it will be seen that the lifetimes are then inversely proportional to the density of impurity centers and to the capture cross-sections. It is not the purpose of this description to provide a theoretical explanation of the different lifetimes of minority carries in P-type or N-type gold doped silicon. In particular, the question as to whether the different values of $\tau_{n0}$ and $\tau_{p0}$ can be ascribed to a differential solubility of gold atoms in P-type or N-type material through the factor N, or to different values of the capture cross-sections $\sigma_{n0}$ and $\sigma_{p0}$, is still open, but in no way affects the practical results on silicon transistors described below.

The present invention provides for varying lifetimes in N and P regions of the transistor by the diffusion of a deep level impurity such as gold throughout an NPN transistor. This diffusion is limited to prevent compensation of the N-type zones, i.e., establishment of P-type conductivity thereof by the acceptor levels of gold impurities. It has been found, as set forth in more detail below, that the limited diffusion of gold throughout a transistor results in a decrease in minority carrier lifetimes in the N-type region of the transistor without a corresponding decrease in minority carrier lifetimes in the P-type region. Without attempting to set forth any complete theoretical explanation of this phenomenon, it is herein presented that the controlled diffusion of gold throughout a transistor results in the attainment of highly desirable device characteristics. It is particularly important regarding the economic feasibility of the present invention that the diffusion of gold need not be limited to to the collector. It is well known in transistor technology that deep level impurities, such as gold, diffuse quite rapidly in semiconducting material such as silicon, so that attempts to limit the extent of gold diffusion in a transistor poses serious control problems. While it is well known that gold has been widely employed in the transistor arts and that at least certain early types of transistors depended upon the acceptor properties of gold impurities to produce rectifying junctions, the present invention materially differs from these prior concepts. Distinction is also to be made between the utilization of gold alloys for ohmic contacts and the diffusion of the present invention. Ohmic contacts are normally attached to transistor zones at relatively low temperatures in order to prevent undesired diffusion of the metal into the transistor body. The present invention, on the other hand, provides for diffusion of the gold impurity throughout the body, and by the attainment of a desired concentration of gold there is attained the improved result wherein the recombination rate is increased in the collector without a material increase in the base.

Considering first the device of the present invention, there is provided hereby an NPN silicon transistor. Preferably the transistor structure has a planar configuration wherein each of the zones extend to one flat surface of the device, although alternative device configurations are also possible. Throughout the transistor structure there is dispersed a limited quantity of gold. Particularly in the transistor collector the concentration of gold is limited to a concentration less than that required for compensation and is maintained of the same order as the concentration of donor atoms therein. By "the same order as" it is meant that variation from a value is limited to substantially a factor of twenty. The upper limit of gold concentration is determined by the impurity level in the collector, for an overly large concentration of gold will compensate the collector region to the extent of reversing the polarity thereof by the acceptor level of gold. It has been determined that maximum reduction in minority carrier lifetimes in excess of carrier equilibrium is obtained by maintaining the gold concentration in the same range as the concentration of donor atoms therein, and yet slightly less than the actual value of concentration of donor atoms. More specifically for a particular NPN silicon transistor, the present invention provides an N-type collector having an impurity concentration in the range of $5\times10^{15}$ to $5\times10^{16}$ donor atoms per cubic centimeter and a concentration of gold in the collector in excess of $1\times10^{15}$ gold atoms per cubic centimeter, but less than the concentration of donor atoms.

Considering now the improved process of the present invention, it is first noted that the steps hereof are particularly directed to inclusion in known manufacturing processes for silicon transistors. There is, in fact, provided hereby a combined method of transistor manufacture requiring only slight variation from conventional manufacturing steps and capable of being accomplished without the utilization of any further equipment beyond that normally employed in transistor manufacture. A double diffused NPN silicon transistor is coated with a thin layer of gold upon the back collector surface of the wafer. In actual practice, a large plurality of transistors are formed from a single wafer, and in commercial operations the present invention is carried out upon a complete wafer within which there are formed this large plurality of transistors. In the following description, reference is made only to a single transistor for clarity of explanation. Following conventional diffusion of an acceptor impurity to form the base region of the transistor and a subsequent diffusion of a donor impurity to form the emitter zone of the transistor, there is applied by vapor deposition a thin layer of gold upon a back side of the transistor collector. This layer may be quite thin, as of the order of one micron. Gold is then diffused throughout the transistor by raising the temperature of the transistor structure and maintaining this elevated temperature for a sufficient period of time to achieve the desired gold concentration, as indicated above. More specifically, the present invention provides for the diffusion of gold into the transistor at a temperature exceeding 920 degrees centigrade. Since the solubility of gold in silicon increases with temperature, the upper limit of the diffusion temperature is determined by the condition that the final concentration of gold in the collector of the transistor be limited to less than that required for compensation of the collector. A practical upper temperature limit is the temperature of maximum solubility of gold in silicon, which is known to be about 1300 degrees centigrade. The process temperature is also maintained below the melting temperature of silicon, i.e., about 1420 degrees centigrade. The doping level of the collector is thus determinative in establishment of the time and temperature of gold diffusion. Diffusion time extends from ten minutes to one-half hour and, of course, is decreased with increasing temperature. This amount of gold diffused throughout the transistor results in the establishment of permanent recombination centers in the collector of the transistor, so as to materially reduce minority carrier lifetimes therein. The gold diffused throughout the base of the transistor does not materially decrease carrier lifetimes, so that the current gain of the transistor remains substantially unaffected by the process hereof.

Considering specific examples of the method of the present invention, there was employed NPN silicon transistors of the mesa and subsequently of the planar type formed by double diffusion in each of the following examples. The collector of the transistor comprised undiffused N-type silicon having phosphorous impurity therein, while the base comprised boron diffused silicon, and the emitter comprised phosphorous diffused silicon. Known diffusion techniques were employed in establishing the foregoing transistor zones by diffusion. The mesa or planar configuration of the transistor operated upon in accordance herewith, and as set forth in the following examples, had a flat back surface upon an undiffused N-type silicon collector of the transistor. Upon this surface there was vapor deposited a very thin layer of pure gold one micron thick. The above-described transistor was then operated upon as set forth in the following examples.

*Example 1*

The transistor was heated to a temperature of 980 degrees centigrade and maintained at this temperature for thirty minutes. Following conventional attachment of ohmic contacts to the transistor zones, the switching time, and current gain of the transistor were tested. It was determined from these tests that the current gain was substantially unaffected, however, the storage time after turn-off of the transistor was found to be reduced by a factor of from 5 to 10 under a plurality of similar tests.

*Example 2*

A plurality of NPN silicon transistors, formed by double diffusion in the manner set forth above, were coated upon the back side of the collectors thereof with a thin layer of gold about one micron thick, and were heated to varying temperatures between 1000 and 1100 degrees centigrade for fifteen minutes. These transistors had a concentration of from $5\times10^{15}$ to $5\times10^{16}$ donor atoms per cubic centimeter in the collector. Investigation of the resultant transistor structure indicated that the gold concentration in the collector of the transistor so processed was greater than $10^{15}$ gold atoms per cubic centimeter in the collector, but less than that required to compensate the collector. These transistors were also completed by the connection of ohmic contacts and suitable encapsulation, and were tested to compare the current gains thereof with identical NPN silicon transistors which had not had gold diffused therethrough. It was found that there was substantially no variation in current gain between the transistors processed in accordance with this example and those not processed. Further measurements showed that the storage time, after turn-off of the transistors processed as stated above, was reduced by a factor of five to ten from the storage times of unprocessed transistors.

The foregoing process was repeated at varying temperatures. It was determined from such processing that a useful reduction of storage time was obtained down to a temperature of about 920 degrees centigrade with diffusion continuing for slightly in excess of one-half hour. Below this temperature only minimum variations in storage time were detected, and extended periods of processing were required. In addition, the process hereof was carried out at temperatures above 1100 degrees centigrade. It was found, however, that excessive compensation or even inversion of the collector material caused excessively high saturation resistance of the transistor or complete loss of transistor action, respectively.

An additional process was carried out to verify the effect of gold upon silicon transistors by employing the process hereof with a PNP silicon transistor. In this case, the P-type collector was coated with a thin layer of gold and heated to a temperature of the order of 980 degrees centigrade for about thirty minutes. The transistor was then completed and tested and found to have a current gain less than one hundredth of an identical PNP transistor not so processed. From the foregoing, it is established that gold atoms exhibit a markedly different effect upon recombination rate in N and P-type silicon. In the last example of processing a PNP transistor, the current gain depended upon the recombination rate in the N-type base, and clearly the diffusion of gold therein brought about a material increase in recombination rate, and consequently, an undesirable decrease in carrier lifetime so that the current gain suffered. Yet in the previous examples of processing NPN transistors, the current gain was not affected by gold diffusion in the transistor, so that the recombination rate in P-type silicon was apparently relatively unaffected by the gold atoms diffused therein.

Of particular importance in connection with the process of the present invention, is the manner in which same fits into known transistor manufacturing processes. Contrary to many prior art attempts to operate upon crystals of semiconducting material during crystal pulling, the present invention provides for the diffusion of gold throughout a transistor after establishment of the transistor junctions. It is even possible, in accordance herewith, to diffuse the gold into the transistor during diffusion of the emitter of the transistor. At any rate, there is only required hereby a single additional heating step, and the temperatures employed are those commonly attained by manufacturing equipment employed in transistor processing. Although the process of this invention is exceedingly simple to execute, it provides advantages hitherto unknown in the art. The very simplicity of the invention commends itself to wide spread utilization in the manufacture of NPN silicon transistors.

What is claimed is:

1. An improved NPN silicon transistor structure comprising an N-type collector, a P-type base, an N-type emitter, and gold dispersed substantially uniformly throughout the transistor structure with a concentration throughout the region of the collector adjacent to the collector-base junction of the order of the concentration of donor atoms therein and less than the concentration for compensation of the collector, whereby the transistor has a minimum switching time and high current gain.

2. An improved NPN silicon transistor structure comprising an N-type collector having an impurity concentration throughout the region of said collector adajacent the collector-base junction in the range of $5\times10^{15}$ to $5\times10^{16}$ donor atoms per cubic centimeter and having gold dispersed substantially uniformily throughout the transistor at a concentration at least in the collector in excess of $10^{15}$ gold atoms per cubic centimeter and less than the concentration of donor atoms whereby the minority carrier lifetimes in the collector are minimized.

References Cited by the Examiner

UNITED STATES PATENTS

| | | | |
|---|---|---|---|
| 2,829,993 | 4/58 | Myer et al. | 148—1.5 |
| 2,962,394 | 11/60 | Andres | 148—1.5 X |
| 2,964,689 | 12/60 | Buschert et al. | 148—1.5 X |
| 2,965,519 | 12/60 | Christenson | 148—1.5 X |
| 3,010,857 | 11/61 | Nelson | 148—33 |
| 3,013,955 | 12/61 | Roberts | 117—200 |
| 3,041,214 | 6/62 | Goetzberger | 148—1.5 |
| 3,063,879 | 11/62 | Strull | 148—33 |
| 3,067,485 | 12/62 | Ciccolella et al. | 148—186 |

HYLAND BIZOT, *Primary Examiner.*

DAVID L. RECK, *Examiner.*